United States Patent [19]
Layton

[11] Patent Number: 4,775,216
[45] Date of Patent: Oct. 4, 1988

[54] FIBER OPTIC SENSOR ARRAY AND METHOD

[75] Inventor: Michael R. Layton, Newbury Park, Calif.

[73] Assignee: Litton Systems, Inc., Beverly Hills, Calif.

[21] Appl. No.: 9,960

[22] Filed: Feb. 2, 1987

[51] Int. Cl.[4] .................................................. G02B 6/16
[52] U.S. Cl. ................................. 350/96.29; 250/227; 356/345
[58] Field of Search ............... 350/96.15, 96.16, 96.29, 350/374, 375, 377, 394, 395, 407; 250/227; 356/345, 359, 360; 370/1, 4

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 TS |
| 4,166,946 | 9/1979 | Chown et al. | 250/199 |
| 4,294,513 | 10/1981 | Nelson et al. | 350/96.29 |
| 4,301,543 | 11/1981 | Palmer | 367/149 |
| 4,307,933 | 12/1981 | Palmer et al. | 350/96.16 |
| 4,307,937 | 12/1981 | Gordon | 350/96.29 |
| 4,360,272 | 11/1982 | Schmadel et al. | 356/352 |
| 4,368,981 | 1/1983 | Ozeki | 356/352 |
| 4,378,143 | 3/1983 | Winzer | 350/96.15 |
| 4,443,700 | 4/1984 | Macedo et al. | 250/227 |
| 4,490,163 | 12/1984 | Jochem et al. | 65/4.21 |
| 4,505,587 | 3/1985 | Haus et al. | 356/345 |
| 4,525,818 | 6/1985 | Cielo et al. | 350/96.15 X |
| 4,530,603 | 7/1985 | Shaw et al. | 356/345 |
| 4,545,253 | 10/1986 | Avicola | 73/655 |
| 4,552,457 | 11/1985 | Giallorenzi | 356/345 |
| 4,588,255 | 5/1986 | Tur et al. | 350/96.16 |
| 4,588,296 | 5/1986 | Cahill et al. | 356/350 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngquist et al. | 356/345 |

FOREIGN PATENT DOCUMENTS

| | | |
|---|---|---|
| 0023345 | 2/1981 | European Pat. Off. . |
| 2473-188 | 7/1981 | France . |
| 3224775 | 1/1983 | Fed. Rep. of Germany . |
| 58-211119 | 12/1983 | Japan . |
| WO79/00377 | 6/1979 | PCT Int'l Appl. . |
| WO83/03684 | 4/1982 | PCT Int'l Appl. . |
| WO83/02496 | 1/1983 | PCT Int'l Appl. . |
| WO85/00221 | 6/1983 | PCT Int'l Appl. . |
| 8301303 | 4/1985 | PCT Int'l Appl. ................. 356/350 |
| 2096762 | 10/1982 | United Kingdom . |

OTHER PUBLICATIONS

Davis, SPIE, vol. 478, Fiber Optic and Laser Sensors, 1984 May, "Fiber Optic Sensors: An Overview", pp. 12–18.

Pavlath et al., Proc. SPIE, (Int. Soc. Opt. Eng.), vol. 412, Apr. 5–7, 1983, "Application of All-Fiber Technology to Sensors", pp. 70–79.

(List continued on next page.)

*Primary Examiner*—William L. Sikes
*Assistant Examiner*—Frank Gonazález
*Attorney, Agent, or Firm*—John H. Lynn

[57] ABSTRACT

A fiber optic sensor array comprises a single transmit optical fiber for guiding an incident optical signal through a plurality of sensing segments in the transmit optical fiber arranged in a series array. The sensor array may includes a single return optical fiber, or the sensors may be arranged in groups with all the member of one group being connected to a corresponding return fiber. Optical couplers formed between the transmit and return optical fibers couple a portion of the incident signal into the return fiber after the signal propagates through each sensing segment. A loop is formed in the transmit fiber at each optical coupler so that the incident signal travels through the sensing segments in one direction and through the return fiber in the opposite direction. The couplers may be identical and may be have either symmetrical or asymmetrical coupling coefficients. Asymmetrical couplers may be used to attenuate the intensities of undesired signals that recirculate in the loops of the array.

28 Claims, 6 Drawing Sheets

OTHER PUBLICATIONS

Sheem et al., "Wavelength Monitoring of Single-Mode Diode Laser Using Guided Wave Interferometer", *Optics Letters,* May 1980, vol. 5, No. 5, pp. 179–181.

Dandridge, et al., "Phase Compensation in Interferometer Fiber Optic Sensors", Optics Letters, vol. 7, No. 6, Jun. 1982, pp. 279–281.

Nelson et al., "Passive Multiplexing Systems for Fiber Optic Sensors", Applied Optics, 9/1980, pp. 2917–2920.

Kersey et al., "Demodulating Scheme Fibre Interferometric Sensors Employing Laser Frequency Switching", *Electronics. Lett.,* vol. 19, No. 3, pp. 102–103.

Nelson et al., "Passive Techniques for Fiber Optics Sensor Systems", I.F.O.C., 3/1981, pp. 27–30.

FIBER OPTIC SENSOR ARRAY AND METHOD

BACKGROUND OF THE INVENTION

This invention relates generally to apparatus and methods for sensing physical phenomena and particularly to fiber optic sensors that use interferometers to sense changes in physical phenomena. This invention relates particularly to fiber optic sensors that respond to changes in a selected field quantity such as pressure, magnetic field, electric field, etc. Still more particularly, this invention relates to a distributed array of fiber optic sensors.

An optical fiber comprises a central core and a surrounding cladding. The refractive index of the core is greater than that of the cladding, and the diameter of the core is so small that light guided by the core impinges upon the core-cladding interface at an angle less than the critical angle for total internal reflection.

A light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate unattenuated are called normal modes. A single mode fiber will propagate only one spatial distribution of energy, that is, one normal mode, for a signal of a given frequency.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as microphones, hydrophones, magnetometers, accelerometers and electric current sensors.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

SUMMARY OF THE INVENTION

A fiber optic recursive sensor array network according to the invention provides greater efficiency than previous arrays. The greater efficiency is a result of arranging a transmit fiber and return fiber to avoid a problem in previous non-recursive lattice type fiber optic sensor arrays where light is lost at dead end light paths at each sensor.

A first embodiment of a fiber optic sensor array according to the invention comprises a single transmit optical fiber for guiding an incident optical signal through a plurality of sensing segments in the transmit optical fiber arranged in a series array. The sensor array according to the invention further includes a single return optical fiber. The sensor array according to the invention also includes a plurality of optical couplers formed between the transmit and return optical fibers to couple a portion of the incident signal into the return fiber after the incident signal propagates through each sensing segment. A loop is formed in the transmit fiber at each optical coupler so that the incident signal travels through the sensing segments in one direction and through the return fiber in the opposite direction.

The optical couplers may have symmetrical or asymmetrical coupling efficiencies. Asymmetrical couplers may be connected in the array to provide attenuation of undesired signals that recirculate in the array. In either case all the couplers may be identical while providing a balanced sensor system that provides nearly uniform amplitude output signals from each sensor.

A fiber optic sensor array according to the invention may also be formed with the sensors arranged in groups with a separate return fiber for each group.

A fiber optic sensor array according to the invention may also be formed with the sensors arranged in sets to form a nested array of sensors to cover a range of frequencies. The nested array has the sensors connected in series. The sensors are arranged so that a first set of sensors each have a length designed for a particular base frequency range of variation in a physical parameter being detected. A second set of sensors for a frequency equal to half the base frequency are connected on each side of the first set with the sensors in the second set including sensing fibers that are a multiple of the length of the sensors in the first set. The sensors in the first set are grouped together so that they comprise part of the second set.

A first method for forming a fiber optic sensor array according to the invention comprises the steps of guiding an incident optical signal on a single transmit optical fiber, arranging a plurality of sensing segments in the transmit optical fiber in a series array, providing a single return optical fiber for guiding signals in a direction opposite to the direction of the incident signal, processing the returned signals in a separate remotely situated interferometer, detecting optical signals from the return optical fiber, forming a plurality of optical couplers between the transmit and return optical fibers to couple a portion of the incident signal into the return fiber after the incident signal propagates through each sensing segment, and forming a loop in the transmit fiber at each optical coupler so that the incident signal propagates through the first (m−1) sensing segments before impinging upon the $m^{th}$ sensing segment and so that the return signal from the $m^{th}$ sensing segment propagates through the first (m−1) segments before impinging upon the detector means.

DESCRIPTION OF THE PREFERRED EMBODIMENT

Apparatus

Figure 1:
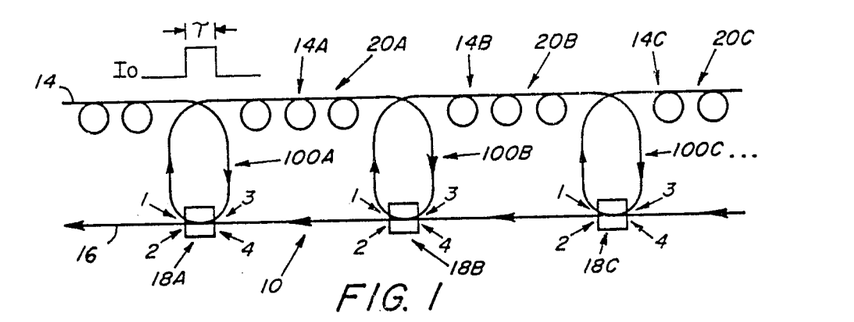
FIG. 1 is a schematic illustration of a sensor array according to the invention.

Referring to FIG. 1, a fiber optic sensor array 10 according to the invention includes a light source, an optical fiber 14, an optical fiber 16 and a plurality of optical couplers 18A, 18B, etc. that couple optical signals between the optical fibers 14 and 16 as explained subsequently. Each adjacent pair of couplers and the lengths of the fibers 14 between the couplers comprise a plurality of sensors 20A, 20B, etc.

The fiber 14 guides light from an optical source (not shown) to port 3 of the coupler 18A. Most of the incident light remains in the fiber 14 and exits the coupler 18A at port 1. A small portion of the light incident upon the coupler 18A couples into the fiber 16 and exits the coupler 18A at port 2. The remaining input signal intensity then propagates through the coil 14A to port 3 of the coupler 18B. Again most of the incident light remains in the fiber 14 and exits the coupler 18B at port 1 for propagation through the coil 14B to the next coupler 18C.

The fiber 14 is formed into a loop 100A at the coupler 18A so that the signal is coupled into the return fiber 16. The signal remaining in the transmit fiber 14 then propagates to the coupler 2. The segment of the fiber between the couplers 18A and 18B is exposed to the field to be measured. The transmit fiber 14 is then formed into a loop 100B at the coupler 18B so that the signal is coupled into the return fiber 16 at the coupler 18B. The structure repeats so that the sensor array 10 includes a plurality of segments that are substantially identical. For purposes of analysis the sensing segments are designated 1, 2, ... m, m+1, ... M−1, M.

The structure of the sensor array 10 is such that a long length of the optical fiber 14 that is sensitized to a particular field quantity (pressure, magnetic field, electric field, etc) is tapped periodically. An optical pulse of peak intensity $I_o$ and width $\tau$ seconds is injected into the transmit fiber 14 so that it propagates through the array 10. The pulse transits each sensor segment, picking up both a static phase delay $\theta_m$ and a dynamic phase variation $\phi_m(t)$. The static phase delay arises from the time required for the pulse to propagate the quiescent length of each sensor segment. The dynamic phase variation arises from changes in the lengths of the segments that are exposed to variations in the field being measured.

The data from each segment is returned as a phase modulation on each return optical pulse. By comparing the phases of the pulses returned from consecutive segments (a mismatched pathlength interferometer will perform the operation) one can measure the dynamic phase modulation that occurred at the latter sensing segment alone. This can be done since all phase modulation occurring up to the last segment was common mode.

The loops in the transmit fiber 14 and properly selected coupling constants cooperate to tap off a small portion of the pulse at each coupler. The tapped portion is then returned in the direction of the source along the single return fiber 16. The remainder of the power in the pulse continues on to the next sensitized segment, in this case the (m+1)st. The key to the efficiency of the sensor array 10 is that, unlike conventional tapped fiber systems (not shown), no light is lost at deadend fiber paths. It should be noted that the transit time from the $m^{th}$ tap coupler through the $m^{th}$ sensor segment to the (m+1)st tap coupler and then back to the $m^{th}$ tap coupler via the return path must be at least as great as the pulse width.

The efficiency of these arrays is approximately 92.25%, which means that over 92% of the light input to the arrays is used for sensing, with only about 7% of the optical power being lost to recirculations. The above described architecture is termed "efficient" since the returned pulse peak power levels are roughly attenuated by 10 log M, where M is the number of discrete sensors. Comparable non-recursive lattice-type structures return signals are attenuated by 20 log M due to light loss at a fiber dead end. Hence, the sensor array 10 is a substantially more efficient structure for large M than lattice structures.

Sensor arrays such as the array 10 have inherent sampling rate limitations. For a network of N sensing loops that each exhibits a characteristic delay T, the maximum number of times per second that the pulse of pulse width $\tau \leq T$ can be input into the system without overlapping the signal is $f_s \leq 1/(NT+\tau)$. The maximum sampling rate is thus $f_s = [NT+\tau]^{-1}$. When time delay T equals the pulse width t, the maximum sampling rate may be written as $f_s = [(N+1)T]^{-1}$. For example suppose the delay T=400 ns, which corresponds to 80 m of fiber in a single loop. If there are 100 such loops, then the network can be interrogated at a maximum rate of 24.75 kHz.

Figure 3:
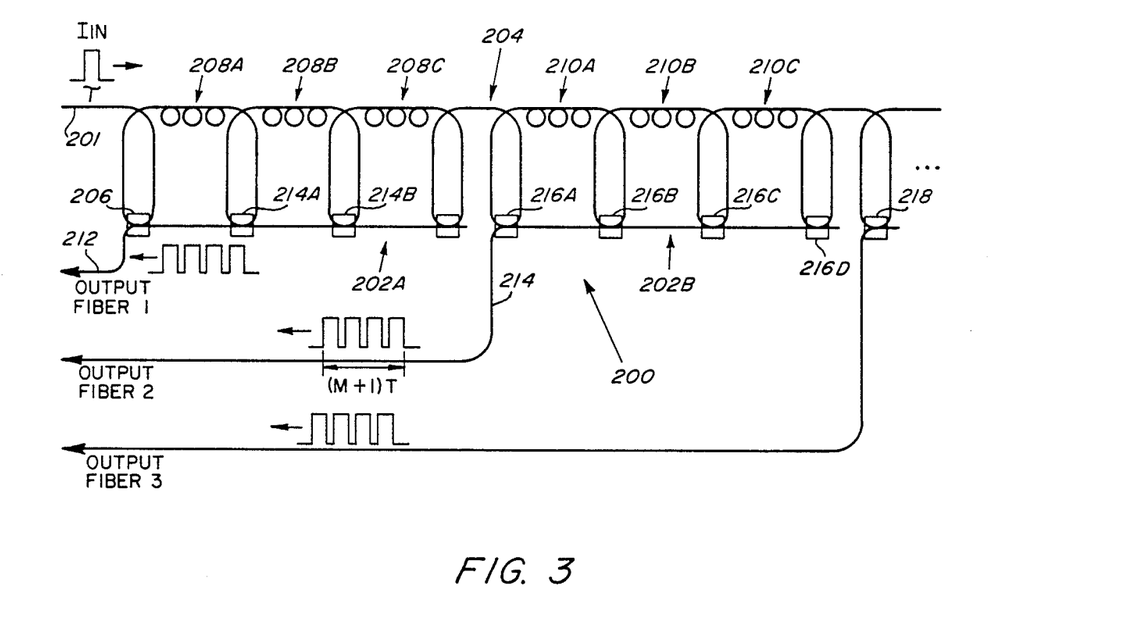
FIG. 3 is a schematic illustration of a second sensor array according to the invention that provides a greater sampling rate than the array of FIG. 1.

FIG. 3 shows a fiber optic sensor array that provides an increased sampling rate beyond that of the array 10 of FIG. 1. A pulse of width t is input to the array 200 via a fiber 201. A coupler 206 cross couples part of the input signal into a first output fiber 212 and guides the remainder of the signal to a plurality of sensors 208A, 208B, etc. Fiber optic directional couplers 214A, 214B etc. couple the signals from the sensing loops 208A, 208B respectively into the output fiber 212. A length of fiber 204 guides the remaining portion of the input pulse to the second sensing section 202B, which comprises a plurality of sensors 210A, 210B etc. Fiber optic directional couplers 216A, 216B etc. couple signals into a second output fiber 214. Signals remaining in the fiber 201 after traversing all of the sensors in the sensing section 202B are input into another sensing section (not shown).

In general, there can be as many output fibers as there are sensing sections. The maximum sampling rate of the array shown in FIG. 3 is $f=([M+1]T)^{-1}$ when the array 200 includes M sensors per sensing section. The efficiency of the array 200 of FIG. 3 is the same as the array 10 of FIG. 1. The additional fiber and couplers used to form the array 200 are required to provide the increased sampling capability.

The array 200 requires N/M output fibers if the system has N total sensors divided into sections that each include M sensors per section. The sampling rate increase may be expressed as the ratio (N+1)/M+1).

It may be shown that the undesired pulse recirculations damp out at a greater rate than the desired components. For example in a one hundred sensor array the ratio of the undesired signal components to the desired signal components is about $2.7 \times 10^{-3}$. This ratio corresponds to a difference of minus 26 dB relative to the signal pulse. This 26 dB difference between the desired and undesired signal components is acceptable for some sensor applications, but in other applications it may be desirable to further attenuate the undesired components.

Figure 4:
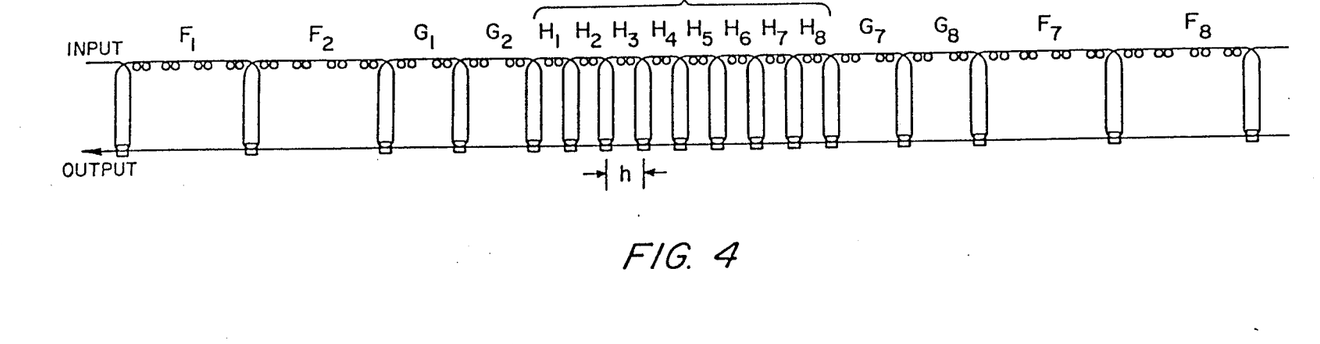
FIG. 4 illustrates a fiber optic sensor array containing a plurality of nested apertures, a single transmit fiber and a single return fiber.
Figure 5:
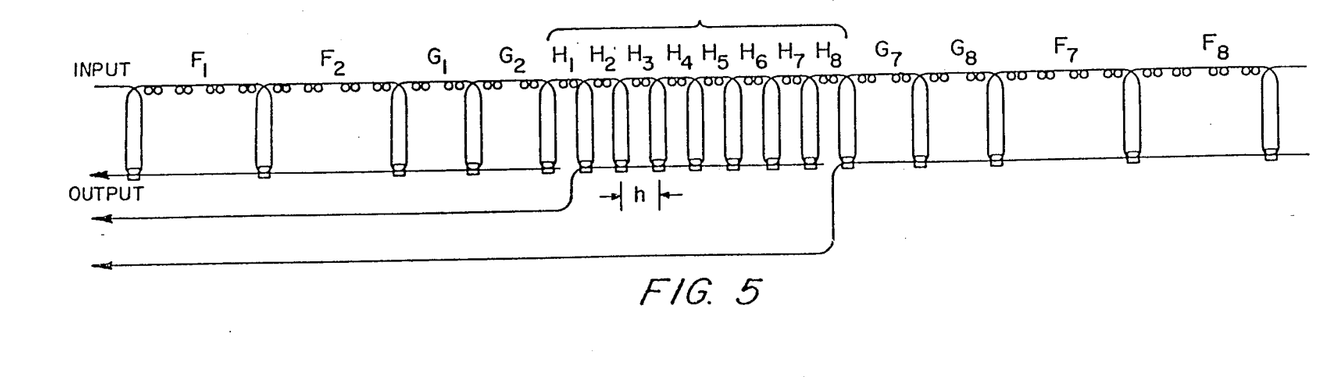
FIG. 5 illustrates a fiber optic sensor array containing a single transmit fiber, a plurality of return fibers and a plurality of nested apertures.

Referring to FIG. 4, a sensor array is formed with individual sensors connected to form nested apertures. The nested aperture arrangement is distinguished from the linear array of FIG. 1. Consider a linear array containing identical, discrete sensors separated by a distance h. Applying the Nyquist criterion to the spatial sampling of a waveform, the separation h between the sensors must be less than half the wavelength. The array gain, or the increase in signal to noise ratio, is a function of the length of the array measured in wavelengths. Therefore an array 10 meters long and containing 20 discrete, equally spaced sensors designed for a wavelength of 1.0 meter has the same array gain as an array 100 meters long and containing 20 sensors designed for a wavelength of 10 meters. Therefore, a set of arrays arranged of selected lengths may be connected together to provide the same array gain over a number of octaves of frequency. It should be noted that the outputs from the sensors in highest frequency array may be summed coherently to give the same information as certain sensors in the lower frequency arrays.

For example, an array to have constant gain at frequencies of $f_0$, $f_0/2$ and $f_0/4$ could be formed so that that the $f_0$ array includes eight sensors of total length $L_0$. The arrays for $f_0/2$ and $f_0/4$ would then have each have eight sensors of total length $2L_0$ and $4L_0$, respectively.

FIG. 4 shows the array to have a first set of sensors H that comprises sensors $H_1$–$H_8$ connected together in series. The sensors $H_1$–$H_8$ each include a sensing coil of length h in an input fiber. The output of each sensor is coupled into an output fiber by means of optical couplers that may be substantially identical.

A second set of sensors G includes a pair of sensors $G_1$ and $G_2$ serially connected to the left of the sensor $H_1$ and a pair of sensors $G_7$ and $G_8$ serially connected to the right of the sensor $H_8$. Each of the sensors $G_1$, $G_2$, $G_7$ and $G_8$ are identical. The two sensing coils shown in each member of the G set indicates that the length of fiber in each sensor in the G set is twice the length of fiber in each sensor in the H set. The combined length of fiber in the two sensors $H_1$ and $H_2$ is equal to the length of fiber in each sensor in the G set. Therefore, the combination of the sensors $H_1$ and $H_2$ comprises a sensor $G_3$. Similarly, the pair of sensors $H_3$ and $H_4$, $H_5$ and $H_6$, and $H_7$ and $H_8$ comprise sensors $G_4$, $G_5$, and $G_6$, which are the remaining members of the G set of sensors.

Still referring to FIG. 4, a third set of sensors F includes a pair of sensors $F_1$ and $F_2$ serially connected to the sensor $G_2$ and a pair of sensors $F_7$ and $F_8$ serially connected to the sensor $G_8$. Each of the sensors $F_1$, $F_2$, $F_7$, and $F_8$ are shown to include four coils to indicate that each sensor in the F sensor set includes a length of fiber equal to four times the length of fiber of each sensor in the H sensor set and twice the length of fiber of each sensor in the G sensor set. The two sensors $G_1$ and $G_2$ comprise the sensor $F_3$. The four sensors $H_1$–$H_4$, which comprise the sensors $G_3$ and $G_4$, comprise the sensor $F_4$. Similarly, the four sensors $H_5$–$H_8$ comprise the sensor $F_5$, and the sensors $G_7$ and $G_8$ comprise the sensor $F_6$.

The number of sensing loops required for an array of M nested apertures when the highest frequency section contains $N_o$ sensors is $N_o + (M-1)N_o/2$. For example, if there are 64 sensors in the array for the maximum frequency, then the total number for six nested apertures is 224. The frequencies covered by such an array could be 1280, 640, 320, 160, 80, and 40 Hz.

Figure 6:
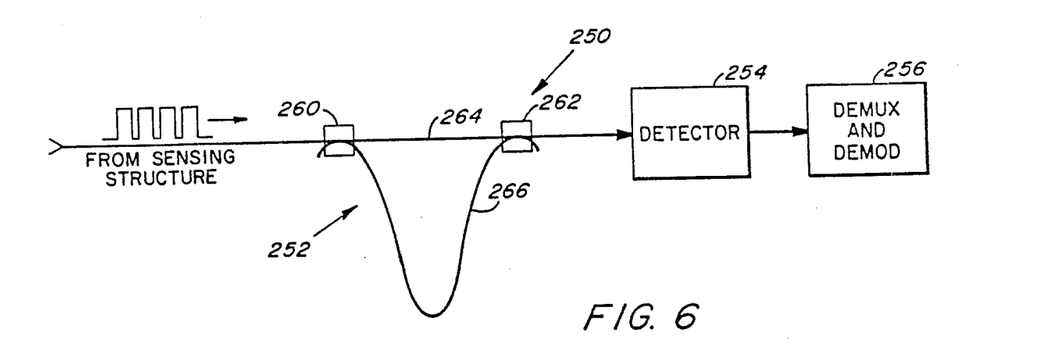
FIG. 6 schematically illustrates an apparatus for processing signals output from a sensor array according to the invention.

Referring to FIG. 6, the output signal from any of the array described above may be processed by a signal processing system 250 that includes a pathlength mismatched fiber optic interferometer 252, a detector 254 and demultiplexing and demodulating circuitry 256. The pathlength mismatched fiber optic interferometer 252 may be an unbalanced Mach-Zehnder interferometer that comprises a pair of couplers 260 and 262 that couple light between a pair of fiber sections 264 and 266 that are of unequal length. The couplers 260 and 262 are preferably 3 dB couplers. The output of the array 10, for example, is input to the coupler 260, which transmits half of the signal directly to the coupler 262 through the fiber 264 and cross couples the remainder of the signal to the other fiber 266. The signals recombine in the coupler 262, but since the fiber sections 264 and 266 have different lengths, there is a time difference between the signals when they recombine in the coupler 262. The purpose of this time difference is to cause the pulses output from adjacent sensors in the array 10 to overlap exactly, converting dynamic differences in phase to dynamic changes in intensity. The detector 254 converts the optical signals incident thereon to electric signals which are then demultiplexed and demodulated to obtain data for the parameter being sensed.

Recursive telemetry analysis will be used to determine the optical intensity returned from each sensing loop $S_n$ of FIG. 1. The signal to be input to the sensor array is a rectangular pulse of intensity $I_o$ and pulse width T, which is chosen to be equal to the delay an optical signal experiences in traversing the closed loop through any single sensor in the array.

Referring to FIG. 1, the coupler 18A may be modeled mathematically by the equations $$I_3 = (1-\kappa)I_1 \quad (1)$$

$$I_4 = \kappa I_1 \quad (2)$$

where $I_i$ is the light intensity at each of the numbered coupler ports and $\kappa$ is the coupling efficiency. It is assumed, although not required, that all of the optical couplers in the array have the same coupling efficiency. An array having identical couplers is discussed here to illustrate the advantages of the present invention. The coupling efficiency of an optical coupler is explained in greater detail subsequently in an appendix to this description of the invention.

It is convenient to define an output pulse $S_o$ to be the pulse tapped via the coupler 18A that does not pass through any of the sensing loops. This pulse is used as a reference for comparing the optical phase of the light that traverses the next loop. An output pulse $S_1$ consists of the light that is not tapped at coupler 18A, but which continues through the first sensing loop in the fiber 14 and which is tapped at the coupler 18B into the return fiber 16. The output pulse $S_1$ also is not cross coupled at the coupler 18A when again passing through that coupler. Other output pulses are defined similarly to the pulse $S_1$ so that the optical intensity of primary returns from the sensing coils can be expressed as $$I_o = \kappa I_{in} \quad (3)$$

where $I_{in}$ is the signal intensity input to each coupler in the array 10. Therefore, using subscripts to designate the sensing loops, the output intensities may be expressed as $$I_1 = \kappa(1-\kappa)^2 I_{in} \quad (4)$$

$$I_2 = \kappa(1-\kappa)^4 I_{in} \quad (5)$$

$$I_3 = \kappa(1-\kappa)^6 I_{in} \quad (6)$$

$$I_N = \kappa(1-\kappa)^{2N} I_{in} \quad (7)$$

Figure 2:
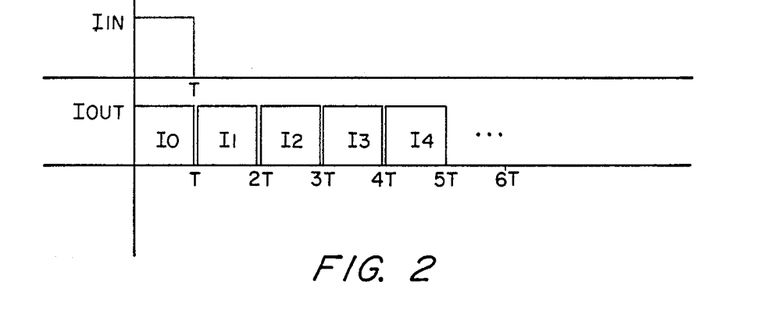
FIG. 2 is a timing diagram showing relationships between input pulses and output pulses for the sensor array of FIG. 1.

The time delays associated with the primary pulses are given by the product of the loop delay T and the subscript number of each loop. Therefore, the reference signal $I_o$ has no net delay; $I_1$ has a delay of T, $I_2$ has a delay of 2T; and $I_N$ has a delay of NT. FIG. 2 is a timing diagram showing the time delays between the signal input to the array and the primary signals output from the sensing coils. The time scale is defined by setting $t=0$ when the leading edge of the input pulse arrives at the center of the coupler 18A.

There is an optimal value of the coupling efficiency $\kappa$ that maximizes the returned power. By definition, $0 \leq \kappa \leq 1$ for any passive coupler, hence without gain. Comparing the signal returned from sensing loop N with the return from sensing loop N+1 yields $$I_N = \kappa(1-\kappa)^{2N} I_{in} \quad (8)$$

$$I_{N+1} = \kappa(1-\kappa)^{2(N+1)} I_{in} \quad (9)$$

The ratio of these signals is $$I_{N+1}/I_N = (1-\kappa)^2. \quad (10)$$

For $\kappa=0$, $I_{N+1}=I_N=0$, which means that there is no coupling. For $\kappa=1$, $I_{N+1}=I_N=0$, which means that all the light couples out of the system at the coupler 18A. For the more general case, $0 \leq \kappa \leq 1$, $I_{N+1} < I_N$. Therefore, maximizing the returned optical intensity from the last sensing loop maximizes it for all sensing loops.

Taking the derivative of Equation (8) with respect to the coupling efficiency $\kappa$ gives $$(dI_N/d\kappa) = \{(1-\kappa)^{2N} - 2N\kappa(1-\kappa)^{2N-1}\} I_{in} \quad (11)$$

setting this derivative equal to zero and solving for $\kappa$ gives the result that the coupling efficiency for maximum intensity is $$\kappa = (2N+1)^{-1}. \quad (12)$$

This analysis assumes that there is no excess loss in either the couplers or the optical fibers.

Considering N sensing loops and N+1 optical couplers having the optimum coupling efficiency given above in Equation (12), the intensities of the primary signals output from each sensing loop are then $$I_0 = [1/(2N+1)] I_{in} \quad (13)$$

$$I_1 = [1/(2N+1)][1-1/(2N+1)]^2 I_{in} \quad (14)$$

$$I_N = [1/(2N+1)][1-1/(2N+1)]^{2N} I_{in}. \quad (15)$$

The expression for the $N^{th}$ sensing loop can be rewritten as $$I_N = [1/(2N+1)][2N/(2N+1)]^{2N} I_{in}. \quad (16)$$

For large values of N, the term $[2N/(2N+1)]^{2N}$ approaches the value $1/e$ where e is the base of the natural logarithm. Therefore, for large N, all terms of Equation (16) share the factors $1/(2N+1)$ and $I_{in}$ and the maximum difference between the intensity of the first and last return pulses is $1/e$, which is $-4.34$ dB. This value is for large N and is a worstcase value. (For small N, the power balance between return pulses is even better than $-4.34$ dB.) As an example consider a 100 sensor array. The optimum coupling efficiency is then $$\kappa = 1/(2N+1) = 1/201. \quad (17)$$

The intensity $I_o$ is given by $\kappa I_{in}=I_{in}/201$, which is $-23.03$ dB relative to the input intensity. The intensity $I_{100}=\kappa(1-\kappa)^{200}I_{in}$, which is $-27.37$ dB relative to the input intensity. For this case the first and last signal intensities differ by only 4.34 dB, which is an excellent intensity balance from pulse to pulse or sensor to sensor.

In addition to the desired set of pulses output from the sensor array 10, there are signals that result from multiple recirculations in the loops. The number and intensities of the undesired pulses that arrive at the output of the array 10 in each time interval T can be determined. The signals output from the array 10 may be written as $$I_o = \kappa I_{in} \tag{18}$$

$$I_1 = \kappa(1-\kappa)^2 I_{in} \tag{19}$$

$$I_2 = \kappa(1-\kappa)^4 I_{in} + \kappa^3(1-\kappa)^2 I_{in} \tag{20}$$

$$I_3 = \kappa(1-\kappa)^6 I_{in} + 2\kappa^3(1-\kappa)^4 I_{in} + \kappa^5(1-\kappa)^2. \tag{21}$$

The two expressions above for $I_o$ and $I_1$ contain no undesired terms, but the terms after the first term in the expressions for $I_2$ and $I_3$ contain terms that result from recirculations of the pulses in the sensing loops. The undesired terms are attenuated because of the exponents of the coupling coefficient. The secondary pulse in $I_2$ rsults from 2 recirculations of the input pulse through the second sensing loop, and has a delay of 2T relative to the input pulse.

At a time delay of 3T, the signal from the third sensing loop arrives at the output of the array 10. This signal will contain three unwanted components. One is due to a single pass through loop 1 and two passes through loop 2. Both of these terms are strongly attenuated because they include a factor of $\kappa^3$. The third unwanted component results from three recirculations around sensing loop 1. This signal component cross couples five time and therefore includes a factor of $\kappa^5$. Since $\kappa$ is small for large arrays, this third component will also be strongly attenuated. A detailed analysis of all the possible recirculations shows that the ratio of the total return signal to the incident signal for any sensor is $$I_N/I_{in} = \sum_{m=0}^{N-1} \binom{N-1}{m} \kappa^{2m+1}(1-\kappa)^{2(N-m)} \tag{22}$$

where:
N is the sensing loop of interest with signals having a delay of $t=NT$;
$\kappa$ is the coupling efficiency, assumed to be the optimum value;
$I_{in}$ is the pulse intensity input with a pulse width less than the tap delay; and $$\binom{N-1}{m} = N!/[(N-M)! \cdot M!],$$

which gives the coefficients of the binomial series.

When the optimum value of $\kappa$ is used the pulses output from the first and last sensors have the greatest amplitude difference. The difference between the first and last pulses is approximately 1/e, which is equivalent o $-4.34$ dB. The 4.34 dB difference between the pulses output from the first and last sensors is a small difference for a sensor array that may include one hundred or more sensors. When using identical couplers this small difference between the maximum and minimum signals is a particular feature of the present invention.

Figure 7:
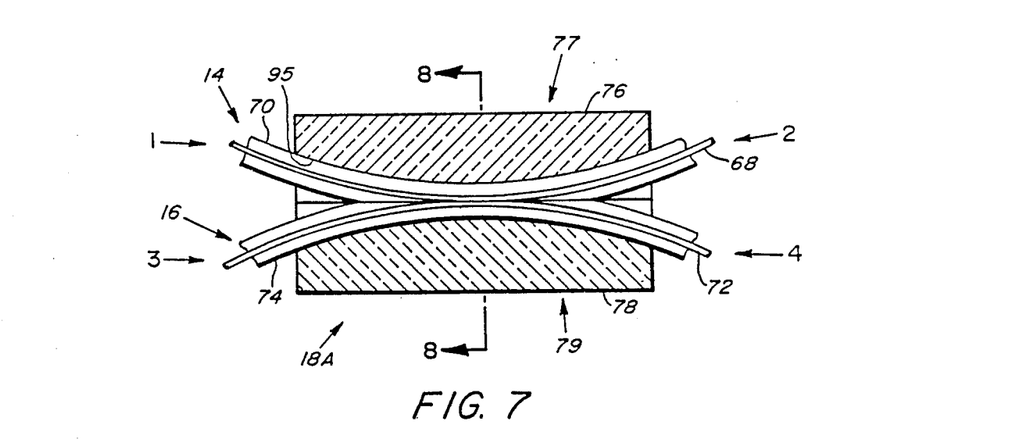
FIG. 7 illustrates a type of fiber optic directional coupler that may be included in a sensor array according to the invention.

A preferred method for attenuating the undesired signal components is to form the sensor array 10 with tap couplers that have asymmetric coupling coefficients. Such couplers will have coupling efficiencies that depend upon which port receives the input signal. Referring to FIG. 7, an asymmetric coupler may be modeled mathematically by $$I_3 = (1-\kappa)I_1 + \gamma\kappa I_2 \tag{23}$$

$$I_4 = (1-\kappa)I_2 + \gamma\kappa I_3 \tag{24}$$

Using couplers represented by Equations (23) and (24) above in the sensor array 10 gives a primary signal pulse intensity from the $n^{th}$ sensor loop equal to $$I_N = \gamma\kappa(1-\kappa)^{2N} \tag{25}$$

For this case the optimum coupling ratio is still given by Equation 17 above. The only difference between the signal output from an array 10 including couplers having an asymmetric coupling factor is the presence of an additional factor of $\gamma$ wherever there appears a factor of $\kappa$ in Equation (22) above. Therefore the desired signal plus the recirculating pulse intensities may be expressed as $$I_N/I_{in} = \sum_{m=0}^{N-1} \binom{N-1}{m} (\kappa\gamma)^{2m+1}(1-\kappa)^{2(N-m)} \tag{26}$$

The factor $\gamma$ represents the ratio of coupling coefficient for light input at port 3 and cross coupled to port 2 to the coupling coefficient for light input at port 4 and cross coupled to port 1. The asymmetrical coupling has the effect of reducing the desired signal pulse by a factor of $\gamma$, but it produces unwanted pulses by factors of $\gamma^3$, $\gamma^5$ etc. Therefore, the asymmetrical coupling provides an additional separation of a factor of $\gamma^2$ between the desired signal and the third order undesired recirculating pulses.

As an example, suppose that the cross coupling ratios are related by a factor of $\gamma=0.1$, which provides a 10 dB attenuation in the recirculated pulses. For a system of 100 sensors, the optimum value of $\kappa$ is 1/201 for this case the intensity of the pulse output from the first sensor is down by 33.1 dB from the input signal the pulse output from the 100th sensor is down by 37.5 dB. The difference between the first and 100th output pulses is still 1/e as is the case when all the couplers are symmetrical. However, both the first and 100th pulses are attenuated by 10 dB in the asymmetrical case. The unwanted third order recirculations are attenuated by a factor of $\gamma^3$. Higher order recirculations are attenuated by factors of $\gamma^5$, and may generally be neglected. The third order recirculating signal is attenuated by an additional 20 dB from the symmetrical coupler situation. Therefore, the undesired signal components are about 56 dB below the desired signal output from the 100th sensor.

A symmetrical fiber optic directional coupler suitable for use in single mode fiber implementations of the invention is described in the Mar. 29, 1980 issue of Electronics Letters, Vol. 18, No. 18. pp. 260–261 and in U.S. Pat. No. 4,493,518 issued Jan. 15, 1985 to Shaw et al. That patent is assigned to the Board of Trustees of the Leland Stanford Junior University.

Figure 8:
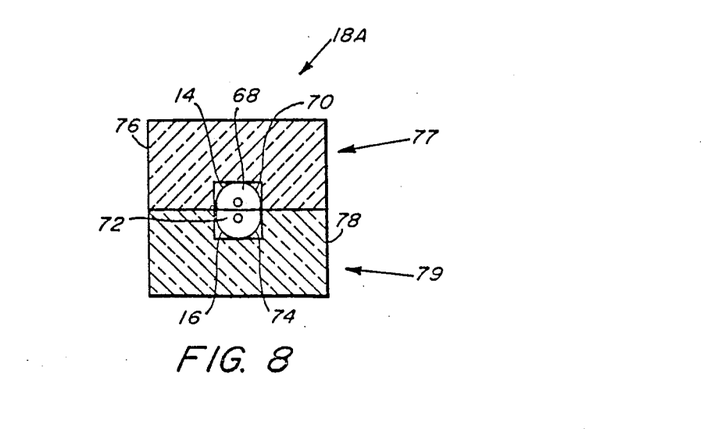
FIG. 8 is a cross sectional view along line 8—8 of FIG. 7.

Referring to FIGS. 7 and 8, optical power can be coupled between two optical fibers 14 and 16 by the evanescent fields that extend outside the fibers. This effect has been used to make integrated-optic couplers where the dielectric waveguides can be fabricated in close enough proximity for evanescent coupling. The fiber 14 has a core 68 and a cladding 70, and the fiber 16 has a core 72 and a cladding 74. With optical fibers the evanescent field is buried deep within the fiber cladding to achieve low loss. Therefore, some claddings 70 and 74 must be removed to expose the evanescent field of the guiding fiber cores 68 and 72, respectively. The couplers used in the present invention may be formed by using a mechanical lapping technique to expose the evanescent fields.

Referring to FIG. 7, the optical fiber 14 is bonded into a curved slot 75 in a quartz block 76. The block 76 and fiber cladding 70 are then ground and polished to within a few microns of the fiber core 68. The polished block 76 and fiber 14 comprise a coupler half 77, and a polished block 78 and the fiber 16 comprise a coupler half 79. Placing the two coupler halves 77 and 79 in contact so that the polished faces confront each other places the cores 68 and 72 in close proximity. An index-matching oil is then inserted by a capillary action between the polished coupler halves 77 and 79 to match the cladding index to the refractive index of the block. This oil also acts as a lubricant to allow one coupler half to be slid over the other, if desired, to change the core-to-core separation and the net coupling.

Referring to FIG. 7, consider light traveling from ports 1 and 3, interacting in the coupling region, and exiting from ports 2 and 4. The input electric fields in fibers 14 and 16 can be expressed as $$E_i(x,y,z,t) = \tfrac{1}{2} E_i(z) a(x,y) e^{j(\beta z - \omega t)} + c.c., \quad i=1,2 \quad (27)$$

where $E_i(z)$ is the complex field amplitude, $\omega$ is the optical frequency, $\beta$ is the fiber propagation constant, and c.c. is the complex conjugate. $E(z)$ changes with $z$ only in the coupling region. The vector $a(x,z)$ is the modal field distribution normalized to unity:

$$\int\int_{-\infty}^{+\infty} a(x,y) a^*(x,y) dx dy = 1 \quad (28)$$

In general, for a single-mode fiber there are two possible orthogonal field distributions, a and b, representing two orthogonal states of polarization, where $$\int\int_{-\infty}^{+\infty} a(x,y) b^*(x,y) dx dy = 0 \quad (29)$$

This analysis always assumes that only one polarization mode is present and does not consider the field distribution any further. More generally, if the directional coupler is polarization independent, any well defined input state of polarization (expressed as a linear combination of (a) and (b) can be thought of as a single "polarization mode." Again, the field distribution need not be considered.

When the fiber guides are evanescently coupled, the z dependence of the complex fields in the optical fibers 14 and 16 follows standard coupled-mode relations:

$$dE_1(z)/dz = jkE_2(z) \quad (30)$$

$$dE_2(z)/dz = jkE_1(z). \quad (31)$$

A constant coupling coefficient per unit length $k$ is assumed. The two fiber guides are considered to be identical, and therefore have identical propagation constants $\beta$. If the coupling starts at $z=0$ with the initial amplitudes of $E_1(0)$ and $E_2(0)$ in fibers 14 and 16, respectively, then for a lossless coupler $$d/dz(|E_1(z)|^2 + |E_2(z)|^2) = 0 \quad (32)$$

Under these conditions the solutions to Equations (30) and (31) are $$E_1(z) = E_1(0) \cos kz + jE_2(0) \sin kz \quad (33)$$

$$E_2(z) = jE_1(0) \sin kz + E_2(0) \cos kz \quad (34)$$

In the directional coupler described above, the coupling is not constant over the interaction region due to the curving of the fibers 14 and 16. The coupling coefficient is a function of $z$ with a maximum value of $k_o$ where the fibers are closest. This coupler can be considered as having an effective coupling length $L_c$ with a constant coupling coefficient $k_o$ given by $$k_o L_c = \int_{-\infty}^{+\infty} k(z) dz \quad (35)$$

Therefore, after the coupled-mode interaction, the complex field amplitudes in the two fibers are $$E_1(L_c) = E_1(0) \cos k_o L_c + jE_2(0) \sin k_o L_c \quad (36)$$

$$E_2(L_c) = jE_1(0) \sin k_o L_c + E_2(0) \cos k_o L_c \quad (37)$$

In many applications, the parameter of interest is the total coupled power. Let $\sin k_o L_c \equiv \kappa^{\frac{1}{2}}$ and thus $\cos k_o L_c = (1-\epsilon)^{\frac{1}{2}}$. Further, the amplitudes $E_1(0)$ and $E_3(0)$ can be regarded as the field amplitudes at two input ports, 1 and 3 while the amplitudes $E_2(L_c)$ and $E_4(L_c)$ can be the field amplitudes at the two output ports 2 and 4. Defining $E_1 \equiv E_1(0)$, $E_3 \equiv E_3(0)$, $E_2 \equiv E_1(L_c)$, and $E_4 \equiv E_3(L_c)$, yields $$E_2 = (1-\kappa)^{\frac{1}{2}} E_1 + j\kappa^{\frac{1}{2}} E_3 \quad (38)$$

$$E_4 = j\kappa^{\frac{1}{2}} E_1 + (1-\kappa)^{\frac{1}{2}} E_3 \quad (39)$$

Consider the case where $E_3 = 0$, so that light is present only in fiber 14.

Equations (38) and (39) reduce to $$E_2 = (1-k)^{\frac{1}{2}} E_1 \quad (40)$$

$$E_4 = jk^{\frac{1}{2}} E_1 \quad (41)$$

When $\kappa = 0$, no coupling occurs between the two fibers. With $\kappa = 0.5$, $|E_2|^2 = |E_4|^2$ and half the power has been coupled from the fiber 14 into the fiber 16. When $\kappa = 1$, $E_2 = 0$ and $|E_4|^2 = |E_1|^2$ and all the power has been coupled. Therefore, $\kappa$ is the intensity coupling constant.

For the case described by Equations (40) and (41), the phase of the light in port 4 is greater than in port 2 by $\pi$2 as indicated by the $j$ factor in the expression for $E_4$. The complete output fields are defined as $E_2$ and $E_4$, as in Equation (27). If $E_2$ has a phase term of $e^{j(\beta z - \omega t)}$, then $E_4$ has a phase term of $e^{j(\beta z - \omega t + \pi/2)}$.

$)=e^{j(\beta z-\omega[t-\pi/(2\omega)])}$. Thus $E_4$ lags $E_2$ in time. Physically, the coupling of power from fiber 14 to fiber 16 occurs because the evanescent electric field in fiber 14 includes a linear polarization in fiber 16 at the optical frequency in phase with the evanescent electric field of fiber 14. The linear polarization in fiber 16 is the driving term in Maxwell's equations and generates an electromagnetic wave in fiber 16 that lags this polarization in time. The driving polarization and driven field in fiber 14 have the proper phase relationship for power exchange from the induced polarization to the field.

The $e^{j(\beta z-\omega t)}$ convention of Equation (27) is chosen so that an increasing fiber length produces an increasing phase and a delay in time. If the convention was chosen to be $e^{j(\omega t-\beta z)}$, the coupling equation (38) would be modified by replacing $j$ by $-j$. Then, in Equations (40) and (41), $E_4$ would have a phase less than $E_2$ by $\pi/2$ rad, and the phase term could be written as $e^{j(\omega t-\beta z-\pi/2)}=e^{j(\omega[t-/2\omega]-\beta z)}$. Again, $E_4$ lags $E_2$ in time, which is consistent with the physical model of a driving polarization producing a power transfer.

Figure 9:
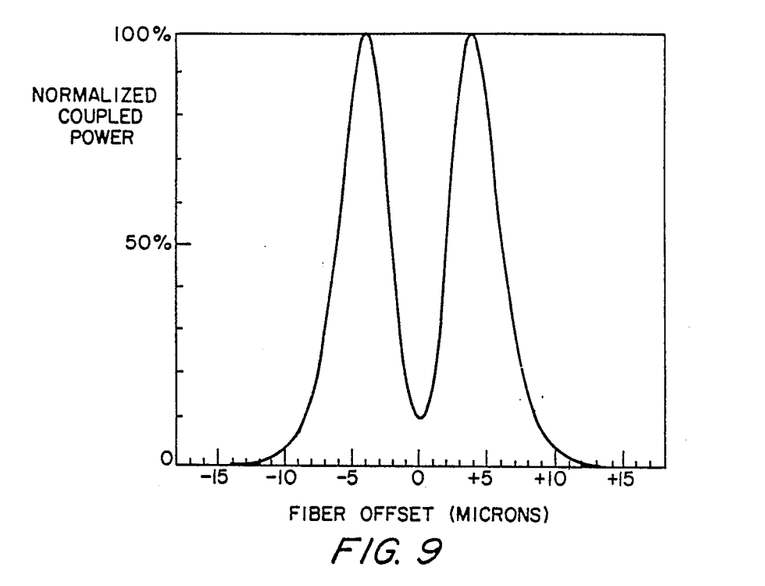
FIG. 9 graphically illustrates the variation of the coupling efficiency of the coupler of FIGS. 7 and 8 as a function of the offset between the cores of the two optical fibers used to form the coupler.

A detailed theoretical and experimental study of this type of coupler was carried out by M. J. F. Digonnet and H. J. Shaw, "Analysis of a Tunable Single-Mode Fiber-Optic Coupler", IEEE J. Quantum Electron., QE-18, 746, (1982). In particular, the intensity coupling constant $\kappa$ was theoretically determined by the coupler geometry and the adjustable core-to-core separation. Since the directional coupler is a true coupled-mode system formed of two identical waveguides, 100% power transfer from one fiber to the other can be achieved. FIG. 9, adapted from Digonnet and Shaw, shows the theoretical and experimental coupling for a typical coupler having power input to one fiber only. When the top block is offset far from the bottom block (e.g., 15 $\mu$m), the cores 70 and 72, shown in FIG. 8, are sufficiently separated so that no coupling occurs. When this offset is approximately 4 $\mu$m, 100% power transfer occurs. With less offset, power is coupled back to the original guide (overcoupling). The coupling may be easily adjusted from 0 to 100%.

The power insertion loss of these couples is low, ranging from 2% to 10%. The directivity is high ($>60$ dB) and the coupling ratio, once adjusted by the offset, is nearly independent of the input state of polarization.

Figure 10:
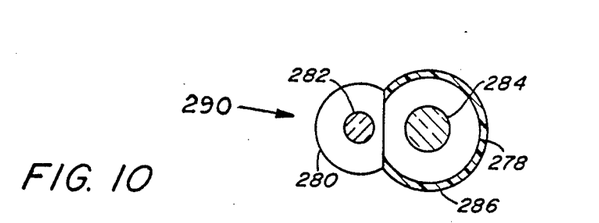
FIGS. 10-12 illustrate an asymmetrical fiber optic directional coupler formed between fibers of different diameters.

There are several structures possible for providing an asymmetric coupler having the coupling characteristics described by Equations (22) and (23). FIg. 10 shows a directional coupler 276 formed from a pair of single mode fibers 278 and 280 from which portions of the claddings have been lapped to permit the cores to be placed close enough together to permit evanescent coupling between waves guided by the two fiber cores. The fiber 280 is shown to have a core 282 that is smaller in diameter than the core 284 of the other fiber. The directional coupler 276 formed between the fibers 278 and 280 having different diameters of cores provides a higher coupling efficiency for light input to the smaller core 282. The interaction region of the fibers 278 and 280 is large enough so that the evanescent field of the light in the smaller core 282 interacts with the larger core 284 more effectively than the evanescent field of the light in the larger core 282 interacts with the smaller core 284. The smaller core diameter may be approximately $4\mu$, and the diameter of the larger core may be about $8\mu$. An important feature of the coupler configuration of FIG. 10 is that part of the light from the larger core would be coupled into a cladding mode of the smaller fiber rather than coupling into the smaller core 282. The cladding modes may be stripped from the larger fiber by using a fiber having an absorbing jacket 286 formed around its cladding.

Figure 11:
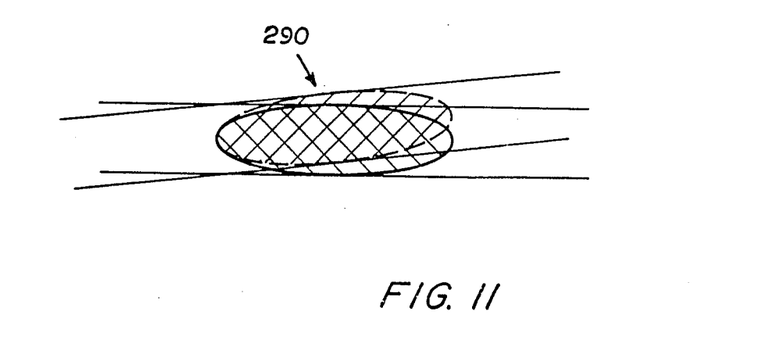
Figure 12:
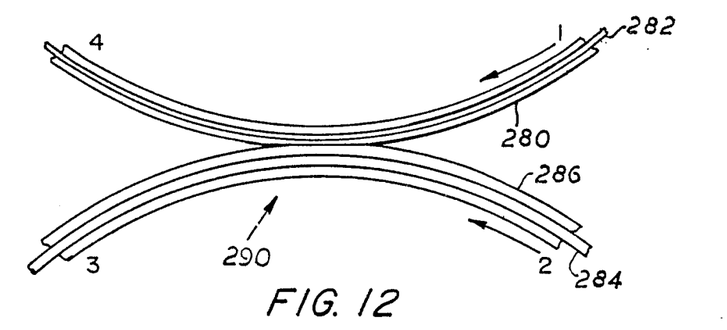

Referring to FIGS. 11 and 12, a coupler 290 may be formed to have an asymmetric coupling region. Coupling occurs in the region of field overlap. The asymmetry of the coupling region provides more efficient coupling in one direction than in the other. FIG. 12 is a side view of a coupler including an interaction region as shown in FIG. 11.

Figure 13:
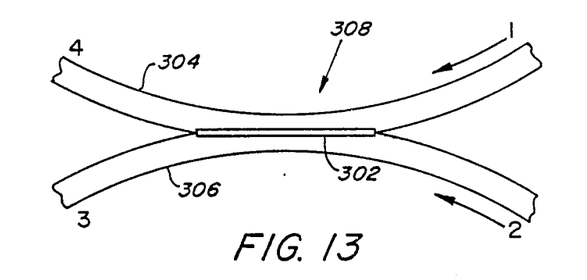
FIG. 13 illustrates a second type of asymmetrical fiber optic directional coupler.

Referring to FIG. 13 an asymmetric coupler 300 may be formed by placing a buffer layer film 302 betwee flattened portions on a pair of optical fibers 304 and 306. The buffer layer 302 is formed of a material that has greater loss for cross coupling in one direction across the interaction region than for the other direction.

Figure 14:
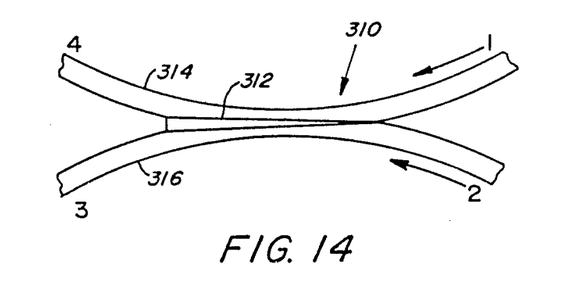
FIG. 14 illustrates a third type of asymmetrical fiber optic directional coupler.

Referring to FIG. 14, a fiber optic directional coupler 310 includes a wedge 312 formed of a crystalline material placed between the flattened portions of a pair of fibers 314 and 316. The wedge 312 makes the interaction region to the fiber asymmetrical about their centers of curvature. Therefore, coupling will be greater for light incident upon ports 1 and 2 than upon light incident upon ports 3 and 4.

Figure 15:
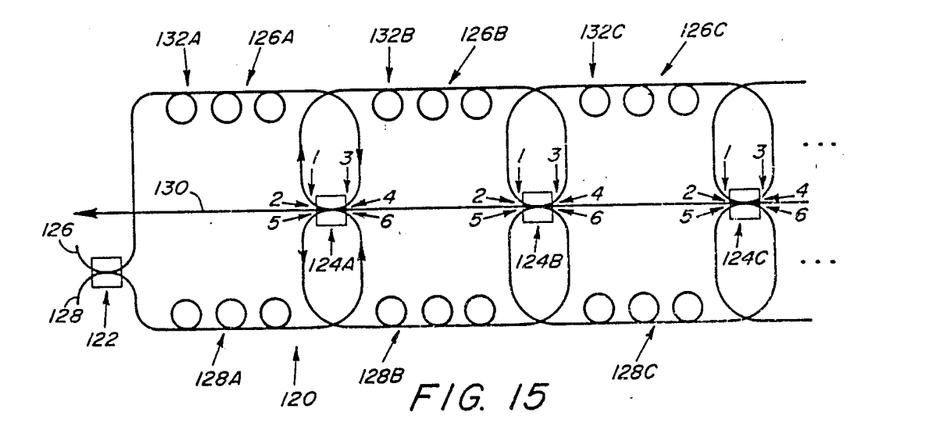
FIG. 15 illustrates a sensor array according to the invention that includes multiple tapped interferometers.

FIG. 15 illustrates a sensor array 120 that includes a $2\times 2$ coupler 122 and plurality of $3\times 3$ tap couplers 124A, 124B etc. that couple light among three optical fibers 126, 128 and 130. The fiber 126 receives an optical signal from a coherent light source (not shown) and guides the signal to the coupler 122. The coupler 122 then divides the input signal equally between the fibers 126 and 128.

Portions 126A, 126B etc. and 128A, 128B, etc. of the fibers 126 and 128, respectively, are exposed to the field being measured. The couplers 122 and 124A and the portions of the fibers 126, 128 and 130 between them comprise a MZ sensor 132A of the array 120. Similarly, the couplers 124A and 124B and the portions of the fibers 126, 128 and 130 between them comprise a MZ sensor 132B. Thus it may be appreciated that the array 120 includes a number of MZ sensors equal to the number of tap couplers in the array.

The fiber 126 guides the signal through the fiber portion 126A to port 3 of the $3\times 3$ coupler 124A. Most of the signal then propagates through the coupler 124A from port 3 to port 1 while the rest of the signal couples into the fiber 130 and is output at port 2. Similarly, the fiber 128 guides the signal through the fiber portion 128A to port 6 of the $3\times 3$ coupler 124A. Most of the signal input to the coupler 124A from the fiber 128 then propagates through the coupler from port 6 to port 5 while the rest of the signal couples into the fiber 130 and is output at port 2. The coupler 124A preferably couples abot 1% or less of the intensity incident from the fibers 126 and 128 into the fiber 130.

After exiting the coupler 124A at port 1, the signal in the fiber 126 then propagates through the fiber portion 126B to port 3 of the coupler 124B. Most of the signal then propagates through the coupler 124B from port 3 to port 1 while the rest of the signal couples into the fiber 130 and is output at port 2. Similarly, the fiber 128 guides the signal through the fiber portion 128A to port 6 of the coupler 124B. Most of the signal input to the coupler 124B from the fiber 128 then propagates through the coupler 124B from port 6 to port 5 while the rest of the signal couples into the fiber 130 and is output at port 2.

The processes described in the preceding paragraph are repeated for each succeeding sensing segment of the array 120.

Figure 16:
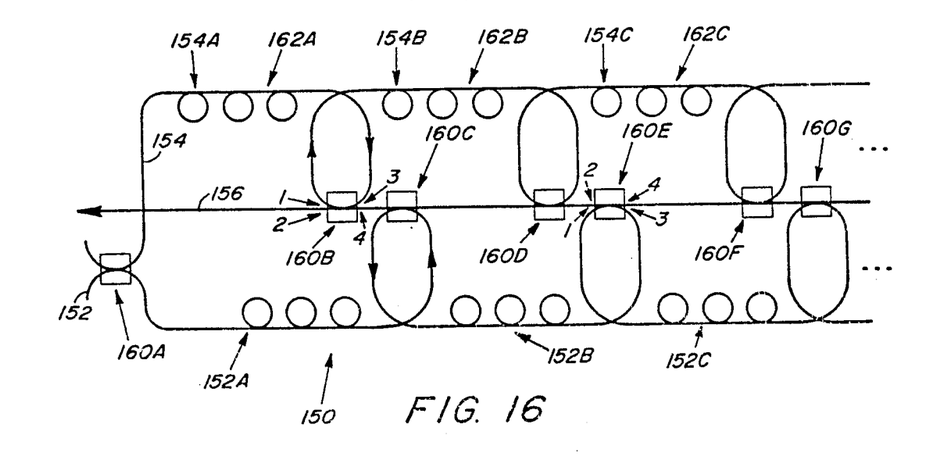
FIG. 16 illustrates a second structure for a multiple tapped interferometric sensor array according to the invention.

FIG. 16 illustrates a multiple tapped sensor array 150 that includes a plurality of 2×2 couplers instead of the 3×3 couplers of the array shown in FIG. 7. Referring to FIG. 16, the array 150 includes a plurality of optical fibers 152, 154 and 156 and a plurality of 2×2 optical couplers 160A, 160B, etc.

The fiber 152 guides an optical signal from a coherent light source (not shown) to the coupler 160A, which then divides the signal equally between the fibers 152 and 154. The light remaining in the fiber 152 then propagates through the fiber portion 152A to port 3 of the coupler 160C where a small part of the incident light couples into the fiber 156. Light remaining in the fiber 152 then propagates through the fiber portion 152B and enters the coupler 160E at port 3. Light coupled into the fiber 154 propagates through the fiber portion 154A to port 3 of the coupler 160B where a small part of the light couples into the fiber 156.

The couplers 160A, 160B and 160C and the portions of the fibers 152 and 154 between those couplers comprise a MZ sensor 162A. Similarly, the couplers 160B, 160C, 160D and 160E and the portions of the fibers 152 and 154 therebetween comprise a MZ sensor 162B. Each pair of fiber portions 152A, 154A, 152B, 154B, etc. and the couplers between successive corresponding fiber portions comprises a MZ sensor.

In the array 120 of FIG. 15 one set of fiber portions 126A, 126B, etc., which may be formed as coils, may be exposed to the field being measured while the other set of fiber portions 128A, 128B, etc. is isolated from the field. This arrangement provides data indicative of the magnitude of the field. If both sets of coils are used as sensing coils, then the signals output to the detector are indicative of the gradient of the field.

Although the invention has been described with reference to certain preferred embodiments, the scope of the invention is not limited to the particular embodiments described. Rather, the scope and spirit of the invention are defined by the appended claims and equivalents thereof.

I claim:
1. A fiber optic sensor array, comprising:
   a single transmit optical fiber for guiding an incident optical signal;
   a plurality of M sensing segments in the transmit optical fiber arranged in a series array;
   a single return optical fiber;
   a plurality of optical couplers formed between the transmit and return optical fibers such that there is an optical coupler connected to each sensing segment for coupling a portion of the incident signal into the return fiber after the incident signal propagates through the corresponding sensing segment; and
   a loop formed in the transmit fiber at each optical coupler so that the incident signal propagates through the first (m−1) sensing segments before impinging upon the $m^{th}$ sensing segment.

2. The fiber optic sensor array of claim 1 wherein all of the optical couplers have substantially identical coupling efficiencies and all of the optical couplers provide symmetric coupling efficiencies for light incident thereon from any direction.

3. The fiber optic sensor array of claim 2, wherein the sensing segments are arranged in sets and a separate return fiber corresponds to each set and is coupled to each sensor in the set.

4. The fiber optic sensor array of claim 1, wherein the sensing segments are arranged in sets and a separate return fiber corresponds to each set and is coupled to each sensor in the set.

5. The fiber optic sensor array of claim 1 wherein the sensors are arranged in a plurality of sets of equal numbers of sensors, the sensors in each set having sensing fibers that are of substantially identical length, a first set of sensors having sensing fibers of length $L_0$ for measuring changes in a physical parameter at a frequency $f_0$, a second set of sensors having sensing fibers of length $2L_0$ for measuring changes in a physical parameter at a frequency $f_0/2$, the first and second sets of sensors being nested and serially connected such that adjacent pairs of sensors in the first set comprise a portion of the members of the second set of sensors.

6. The fiber optic sensor array of claim 5, wherein the sensing segments are arranged in sets and a separate return fiber corresponds to each set and is coupled to each sensor in the set.

7. The fiber optic sensor array of claim 1, wherein all of the the optical couplers have asymmetrical coupling efficiencies and are connected such that the amplitudes of recirculating pulses are attenuated.

8. The fiber optic sensor array of claim 7, wherein the sensing segments are arranged in sets and a separate return fiber corresponds to each set and is coupled to each sensor in the set.

9. The fiber optic sensor array of claim 8 wherein the sensors are arranged in a plurality of sets of equal numbers of sensors, the sensors in each set having sensing fibers that are of substantially identical length, a first set of sensors having sensing fibers of length $L_0$ for measuring changes in a physical parameter at a frequency $f_0$, a second set of sensors having sensing fibers of length $2L_0$ for measuring changes in a physical parameter at a frequency $f_0/2$, the first and second sets of sensors being nested and serially connected such that adjacent pairs of sensors in the first set comprise a portion of the members of the second set of sensors.

10. The fiber optic sensor array of claim 9, wherein the sensing segments are arranged in sets and a separate return fiber corresponds to each set and is coupled to each sensor in the set.

11. A method for forming a fiber optic sensor array, comprising the steps of:
   guiding an incident optical signal on a single transmit optical fiber;
   arranging a plurality of M sensing segments in the transmit optical fiber in a series array;
   providing a single return optical fiber for guiding signals in a direction opposite to the direction of the incident signal;
   detecting optical signals from the return optical fiber;
   forming a plurality of optical couplers between the transmit and return optical fibers such that there is an optical coupler connected to each sensing segment for coupling a portion of the incident signal into the return fiber after the incident signal propagates through the corresponding sensing segment; and
   forming a loop in the transmit fiber at each optical coupler so that the incident signal propagates through the first (m−1) sensing segments before impinging upon the $m^{th}$ sensing segment.

12. The method of claim 11 including the step of forming all of the optical couplers to have substantially identical coupling efficiencies and to provide symmetric coupling efficiencies for light incident thereon from any direction.

13. The method of claim 12, including the steps of:
arranging the sensing segments in sets; and
connecting a separate return fiber to each set.

14. The method of claim 11, including the steps of:
arranging the sensing segments in sets; and
connecting a separate return fiber to each set.

15. The method of claim 11, further including the steps of:
arranging in a plurality of sets of equal numbers of sensors such that the sensors in each set have sensing fibers that are of substantially identical length;
forming a first set of sensors to have sensing fibers of length $L_0$ for measuring changes in a physical parameter at a frequency $f_0$; and
forming a second set of sensors having sensing fibers of length $2L_0$ for measuring changes in a physical parameter at a frequency $f_0/2$, the first and second sets of sensors being nested and serially connected such that adjacent pairs of sensors in the first set comprise a portion of the members of the second set of sensors.

16. The method of claim 15 including the steps of:
arranging the sensing segments in sets; and
connecting a separate return fiber to each set.

17. The method of claim 11 further including the steps of:
forming all of the optical couplers to have asymmetrical coupling efficiencies; and
connecting the couplers such that the amplitudes of recirculating pulses in the array are attenuated.

18. The method of claim 17, including the steps of:
arranging the sensing segments in sets; and
connecting a separate return fiber to each set.

19. The method of claim 18, including the steps of:
arranging the sensors in a plurality of sets of equal numbers of sensors;
forming the sensors in each set to have sensing fibers that are of substantially identical length;
forming a first set of sensors to include sensing fibers of length $L_0$ for measuring changes in a physical parameter at a frequency $f_0$;
forming a second set of sensors to have sensing fibers of length $2L_0$ for measuring changes in a physical parameter at a frequency $f_0/2$; and
nesting and serially connecting the first and second sets of sensors such that adjacent pairs of sensors in the first set comprise a portion of the members of the second set of sensors.

20. The method of claim 19, including the steps of:
arranging the sensing segments in sets; and
connecting a separate return fiber to each set.

21. A fiber optic sensor array, comprising:
a pair of transmit optical fibers;
means for introducing an incident optical signal into each of the transmit optical fibers;
a first plurality of sensing segments formed in a first one of the transmit optical fibers in a series array;
a second plurality of sensing segments formed in the other one of the transmit optical fibers in a series array;
a single return fiber;
detector means for receiving optical signals from the return optical fiber; and
a plurality of optical coupling means formed between the pair of transmit and return optical fibers such that there is an optical coupler connected to each sensing segment for coupling a portion of the incident signal into the return fiber after the incident signal propagates through the corresponding sensing segment so that the incident signal in each transmit fiber propagates through the first (m−1) sensing segments therein before impinging upon the $m^{th}$ sensing segment.

22. The fiber optic sensor array of claim 21 wherein the optical coupling means comprises a 3×3 optical directional coupler formed between the sensing segments of the transmit optical fibers to couple energy from the pair of transmit optical fibers and the receive optical fiber.

23. The fiber optic sensor array of claim 22 wherein each transmit optical fiber includes a loop formed therein at each 3×3 directional coupler so that the return fiber carries return signals through each coupler with the return signals propagating in opposite directions in the transmit and return optical fibers.

24. The fiber optic sensor array of claim 21 wherein the optical coupling means comprises:
a first array of 2×2 optical couplers formed between the sensing segments of the first transmit optical fiber to couple energy from the first transmit optical fiber to the receive optical fiber; and
a second array of 2×2 optical couplers formed between the sensing segments of the second transmit optical fiber to couple energy from the second transmit optical fiber to the receive optical fiber.

25. A method for forming a fiber optic sensor array, comprising the steps of:
means for introducing an incident optical signal into each of a pair of transmit optical fibers;
forming a first plurality of sensing segments in a first one of the transmit optical fibers in a series array;
forming a second plurality of sensing segments in a series array in the other one of the transmit optical fibers;
providing a single return fiber;
detecting optical signals from the return optical fiber; and
forming a plurality of optical coupling means between the pair of transmit and return optical fibers such that there is an optical coupler connected to each sensing segment for coupling a portion of the incident signal into the return fiber after the incident signal propagates through the corresponding sensing segment so that the incident signal in each transmit fiber propagates through the first (m−1) sensing segments in the fiber before impinging upon the $m^{th}$ sensing segment.

26. The method of claim 25, further comprising the step of forming a 3×3 optical directional coupler formed between the sensing segments of the transmit optical fibers to couple energy from the pair of transmit optical fibers and the receive optical fiber.

27. The method of claim 26, further comprising the step of forming each transmit optical fiber to include a loop formed therein at each 3×3 directional coupler so that the return fiber carries return signals through each coupler with the return signals propagating in opposite directions in the transmit and return optical fibers.

28. The method of claim 27, further comprising the steps of:

forming a first array of 2×2 optical couplers between the sensing segments of the first transmit optical fiber to couple energy from the first transmit optical fiber to the receive optical fiber; and forming a second array of 2×2 optical couplers between the sensing segments of the second transmit optical fiber to couple energy from the second transmit optical fiber to the receive optical fiber.

* * * * *